(12) United States Patent
Laws

(10) Patent No.: US 12,637,101 B2
(45) Date of Patent: May 26, 2026

(54) SYSTEMS AND METHODS FOR CONTROL STATE ESTIMATION OF VEHICLES BASED ON FORCE DISTURBANCE SIGNALS

(71) Applicant: GM CRUISE HOLDINGS LLC, San Francisco, CA (US)

(72) Inventor: Shad Laws, Redwood City, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 294 days.

(21) Appl. No.: 17/710,636

(22) Filed: Mar. 31, 2022

(65) Prior Publication Data

US 2023/0311931 A1 Oct. 5, 2023

(51) Int. Cl.
| | |
|---|---|
| *B60W 30/02* | (2012.01) |
| *B60W 60/00* | (2020.01) |
| *B62D 6/04* | (2006.01) |
| *G07C 5/02* | (2006.01) |

(52) U.S. Cl.
CPC ............. B60W 60/001 (2020.02); G07C 5/02 (2013.01); *B60W 2520/10* (2013.01); *B60W 2520/105* (2013.01); *B60W 2520/14* (2013.01); *B60W 2520/16* (2013.01); *B60W 2520/18* (2013.01); *B60W 2552/15* (2020.02)

(58) Field of Classification Search
CPC ........... B60W 60/001; B60W 2520/10; B60W 2520/105; B60W 2520/14; B60W 2520/16; B60W 2520/18; B60W 2552/15; G07C 5/02
USPC ......................................................... 701/534
See application file for complete search history.

(56) References Cited

U.S. PATENT DOCUMENTS

| | | | | | |
|---|---|---|---|---|---|
| 9,201,424 | B1 * | 12/2015 | Ogale | .................. | G05D 1/0253 |
| 11,187,793 | B1 * | 11/2021 | Liu | ...................... | G05D 1/0214 |
| 2008/0059034 | A1 * | 3/2008 | Lu | ....................... | B60T 8/17552 701/41 |

(Continued)

FOREIGN PATENT DOCUMENTS

| | | | | |
|---|---|---|---|---|
| DE | 102005012584 | B4 * | 1/2019 | ............. B62D 6/006 |
| JP | 3637801 | B2 * | 4/2005 | |

OTHER PUBLICATIONS

International Standard ISO-8855, "Road vehicles—Vehicle dynamics and road-holding ability—Vocabulary", Second Edition, Dec. 15, 2011, 50 pages.

*Primary Examiner* — Jelani A Smith
*Assistant Examiner* — George A Alcorn, III
(74) *Attorney, Agent, or Firm* — CANTOR COLBURN LLP

(57) ABSTRACT

For one embodiment of the present invention, a computer implemented method for determining force disturbance signals for a vehicle is described. The computer implemented method includes obtaining sensor signals from a sensor system of the vehicle to monitor driving operations and to determine localization of the vehicle. The computer implemented method further includes determining a set of parameters including vehicle pose estimation, velocity, acceleration, roll, pitch, yaw rate based on the localization and the sensor signals and determining force disturbance signals including lateral force disturbances for front and rear axle lateral accelerations and a total longitudinal force disturbance based on the localization and the sensor signals.

18 Claims, 6 Drawing Sheets

(56) References Cited

U.S. PATENT DOCUMENTS

| | | | |
|---|---|---|---|
| 2014/0354196 A1* | 12/2014 | Ahmad | H02P 23/30 |
| | | | 318/254.1 |
| 2019/0266516 A1* | 8/2019 | Olabiyi | B60W 30/0956 |
| 2020/0039523 A1* | 2/2020 | Ghasemalizadeh | B62D 15/025 |
| 2022/0063597 A1* | 3/2022 | Narita | B60Q 3/70 |
| 2022/0066456 A1* | 3/2022 | Ebrahimi Afrouzi | |
| | | | G06F 3/04883 |
| 2022/0410927 A1* | 12/2022 | Lee | B60W 60/0051 |
| 2023/0398966 A1* | 12/2023 | Kerber-Wunderlich | |
| | | | B60T 8/176 |

* cited by examiner

200

AUTONOMOUS VEHICLE

SENSOR SYSTEM 1
202

•
•
•

SENSOR SYSTEM N
204

224

CHASSIS
CONTROLLER
222

COMPUTING SYSTEM
212

PROCESSOR
214

MEMORY
216

PATH PLANNING SYSTEM
218

CONTROL SYSTEM
220

230

VEHICLE
PROPULSION
SYSTEM
206

BRAKING
SYSTEM
208

STEERING
SYSTEM
210

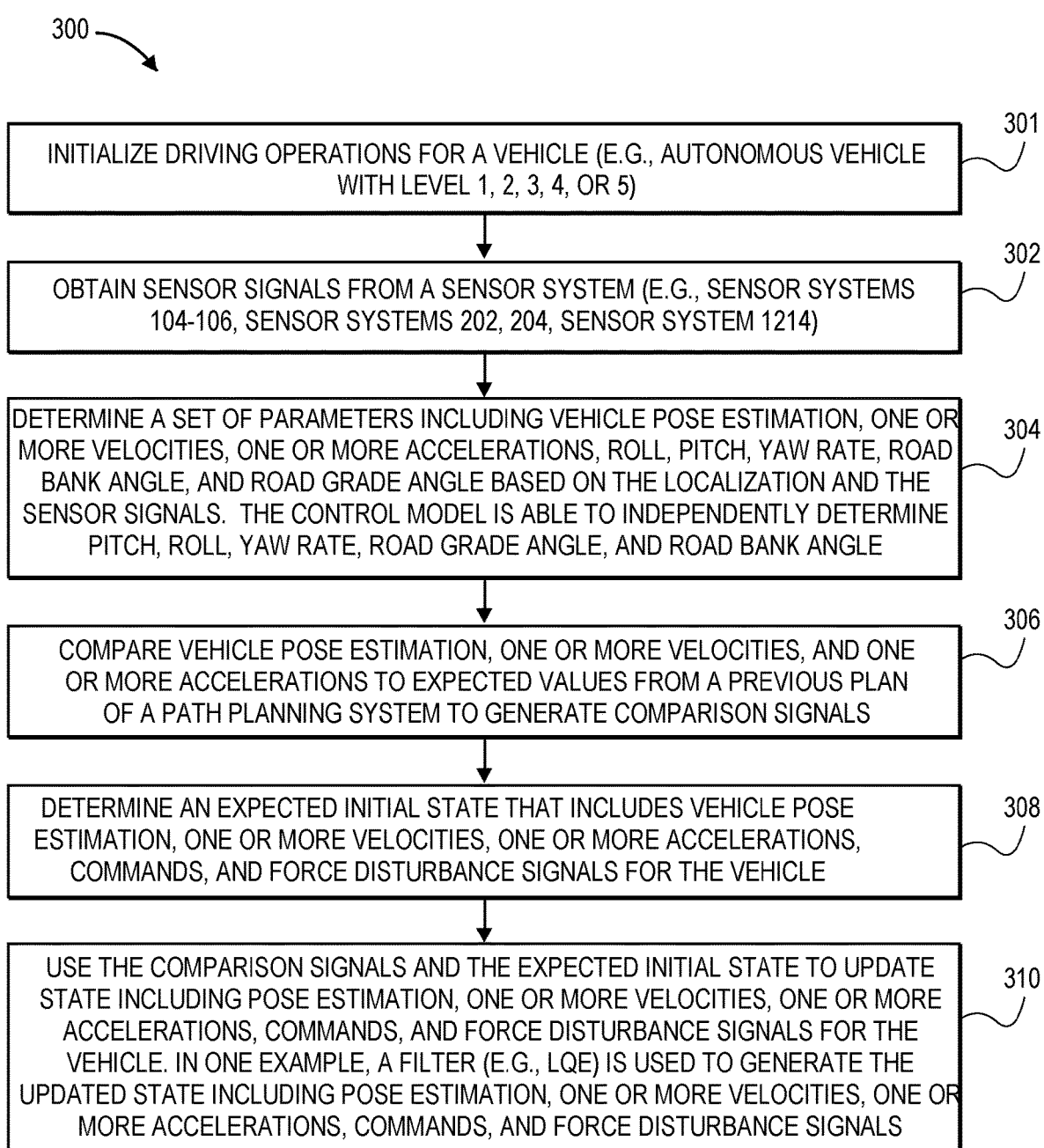

300

301
INITIALIZE DRIVING OPERATIONS FOR A VEHICLE (E.G., AUTONOMOUS VEHICLE WITH LEVEL 1, 2, 3, 4, OR 5)

302
OBTAIN SENSOR SIGNALS FROM A SENSOR SYSTEM (E.G., SENSOR SYSTEMS 104-106, SENSOR SYSTEMS 202, 204, SENSOR SYSTEM 1214)

304
DETERMINE A SET OF PARAMETERS INCLUDING VEHICLE POSE ESTIMATION, ONE OR MORE VELOCITIES, ONE OR MORE ACCELERATIONS, ROLL, PITCH, YAW RATE, ROAD BANK ANGLE, AND ROAD GRADE ANGLE BASED ON THE LOCALIZATION AND THE SENSOR SIGNALS. THE CONTROL MODEL IS ABLE TO INDEPENDENTLY DETERMINE PITCH, ROLL, YAW RATE, ROAD GRADE ANGLE, AND ROAD BANK ANGLE

306
COMPARE VEHICLE POSE ESTIMATION, ONE OR MORE VELOCITIES, AND ONE OR MORE ACCELERATIONS TO EXPECTED VALUES FROM A PREVIOUS PLAN OF A PATH PLANNING SYSTEM TO GENERATE COMPARISON SIGNALS

308
DETERMINE AN EXPECTED INITIAL STATE THAT INCLUDES VEHICLE POSE ESTIMATION, ONE OR MORE VELOCITIES, ONE OR MORE ACCELERATIONS, COMMANDS, AND FORCE DISTURBANCE SIGNALS FOR THE VEHICLE

310
USE THE COMPARISON SIGNALS AND THE EXPECTED INITIAL STATE TO UPDATE STATE INCLUDING POSE ESTIMATION, ONE OR MORE VELOCITIES, ONE OR MORE ACCELERATIONS, COMMANDS, AND FORCE DISTURBANCE SIGNALS FOR THE VEHICLE. IN ONE EXAMPLE, A FILTER (E.G., LQE) IS USED TO GENERATE THE UPDATED STATE INCLUDING POSE ESTIMATION, ONE OR MORE VELOCITIES, ONE OR MORE ACCELERATIONS, COMMANDS, AND FORCE DISTURBANCE SIGNALS

FIG. 3

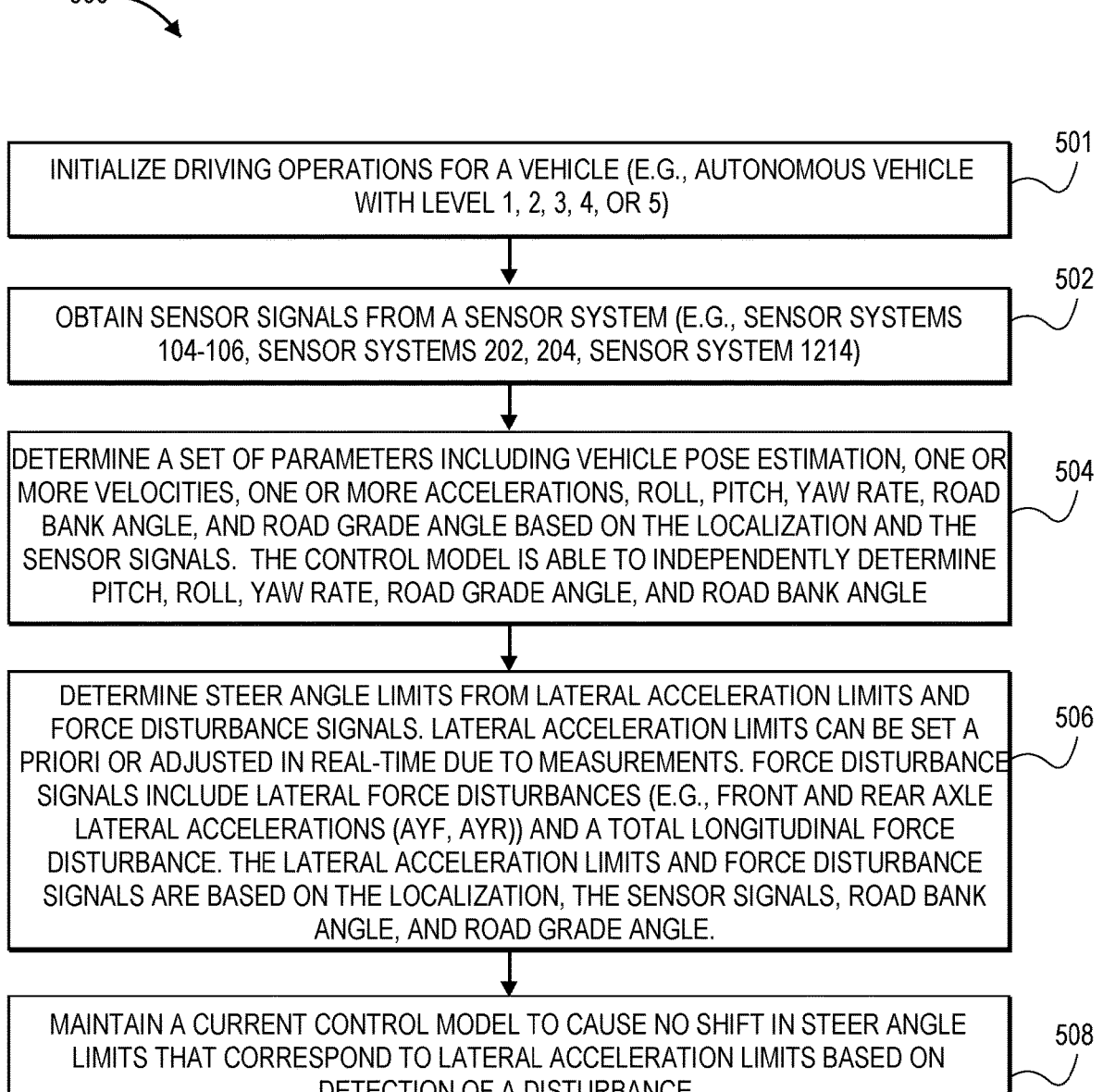

500

INITIALIZE DRIVING OPERATIONS FOR A VEHICLE (E.G., AUTONOMOUS VEHICLE WITH LEVEL 1, 2, 3, 4, OR 5)

501

OBTAIN SENSOR SIGNALS FROM A SENSOR SYSTEM (E.G., SENSOR SYSTEMS 104-106, SENSOR SYSTEMS 202, 204, SENSOR SYSTEM 1214)

502

DETERMINE A SET OF PARAMETERS INCLUDING VEHICLE POSE ESTIMATION, ONE OR MORE VELOCITIES, ONE OR MORE ACCELERATIONS, ROLL, PITCH, YAW RATE, ROAD BANK ANGLE, AND ROAD GRADE ANGLE BASED ON THE LOCALIZATION AND THE SENSOR SIGNALS. THE CONTROL MODEL IS ABLE TO INDEPENDENTLY DETERMINE PITCH, ROLL, YAW RATE, ROAD GRADE ANGLE, AND ROAD BANK ANGLE

504

DETERMINE STEER ANGLE LIMITS FROM LATERAL ACCELERATION LIMITS AND FORCE DISTURBANCE SIGNALS. LATERAL ACCELERATION LIMITS CAN BE SET A PRIORI OR ADJUSTED IN REAL-TIME DUE TO MEASUREMENTS. FORCE DISTURBANCE SIGNALS INCLUDE LATERAL FORCE DISTURBANCES (E.G., FRONT AND REAR AXLE LATERAL ACCELERATIONS (AYF, AYR)) AND A TOTAL LONGITUDINAL FORCE DISTURBANCE. THE LATERAL ACCELERATION LIMITS AND FORCE DISTURBANCE SIGNALS ARE BASED ON THE LOCALIZATION, THE SENSOR SIGNALS, ROAD BANK ANGLE, AND ROAD GRADE ANGLE.

506

MAINTAIN A CURRENT CONTROL MODEL TO CAUSE NO SHIFT IN STEER ANGLE LIMITS THAT CORRESPOND TO LATERAL ACCELERATION LIMITS BASED ON DETECTION OF A DISTURBANCE.

SYSTEMS AND METHODS FOR CONTROL STATE ESTIMATION OF VEHICLES BASED ON FORCE DISTURBANCE SIGNALS

TECHNICAL FIELD

Embodiments described herein generally relate to the fields of autonomous vehicles and driver assistance vehicles, and more particularly relate to systems and methods for control state estimation of vehicles.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

SUMMARY

For one embodiment of the present invention, systems and methods for control state estimation of vehicles are described. A computer implemented method for determining force disturbance signals for a vehicle is described. The computer implemented method includes obtaining sensor signals from a sensor system of the vehicle to monitor driving operations and to determine localization of the vehicle. The computer implemented method further includes determining a set of parameters including vehicle pose estimation, velocity, acceleration, roll, pitch, yaw rate based on the localization and the sensor signals and determining force disturbance signals including lateral force disturbances for front and rear axle lateral accelerations and a total longitudinal force disturbance based on the localization and the sensor signals.

Other features and advantages of embodiments of the present invention will be apparent from the accompanying drawings and from the detailed description that follows below.

BRIEF DESCRIPTION OF THE DRAWINGS

FIG. 3 illustrates a computer-implemented method 300 for determining force disturbance signals of a switch-free control model based on sensor signals from a sensor system in accordance with one embodiment.

FIG. 5 illustrates a computer-implemented method 500 for control of lateral acceleration limits when disturbances to a vehicle occur in accordance with one embodiment.

DETAILED DESCRIPTION OF EMBODIMENTS

Figure 1:
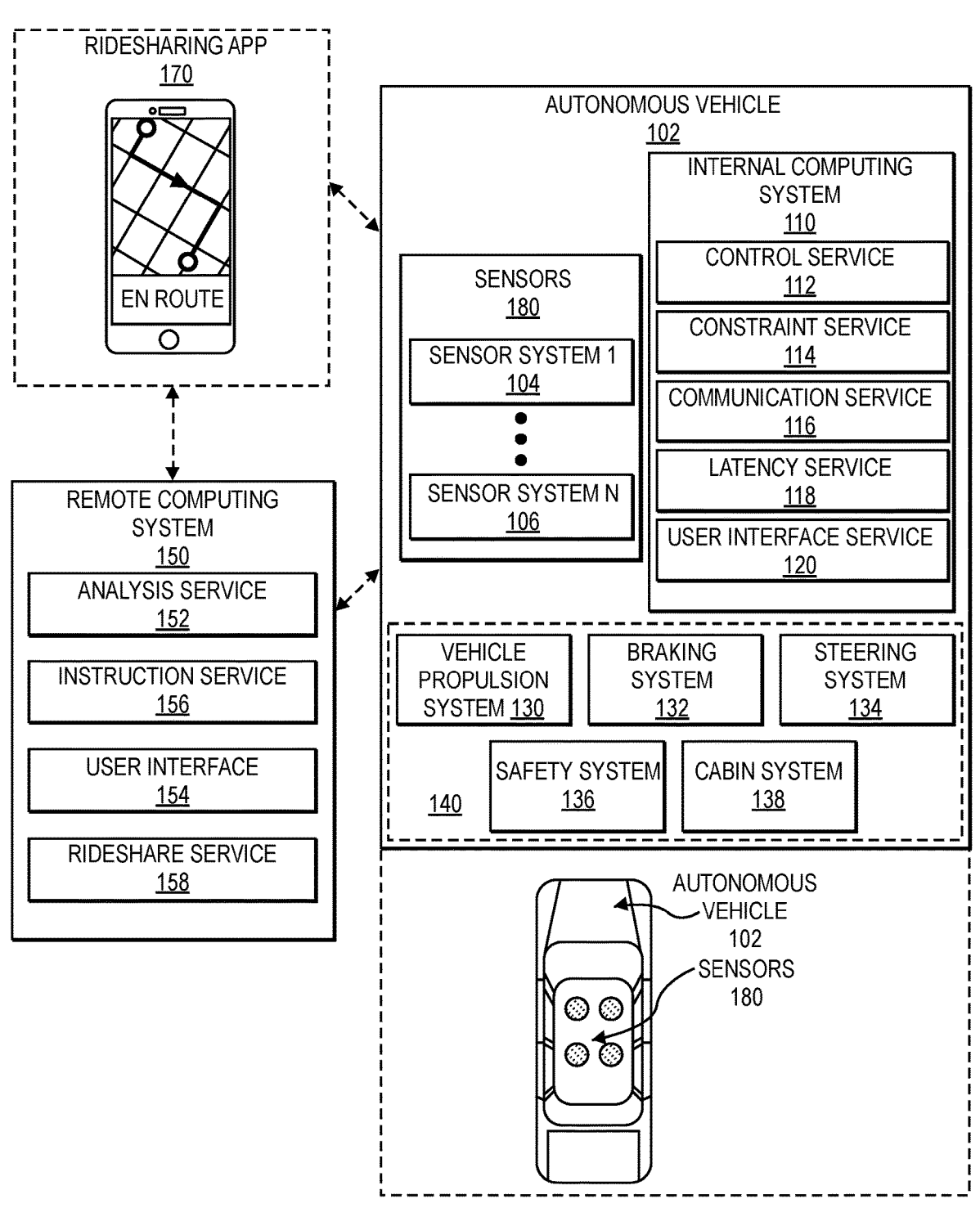
FIG. 1 illustrates an autonomous vehicle and remote computing system architecture in accordance with one embodiment.

For latitude control of an autonomous vehicle (AV), some approaches use a control model that diverges at zero speed. This results in needing multiple control models for different speeds and having to switch between different control models for different speeds. A divergent control model can result in unsafe driving conditions. The control model of some approaches is not able to separately model road grade angle and road bank angle and also lacks 3D modeling due to not being able to determine absolute position of a vehicle from the gyroscope or accelerometer data.

Poor rejection of disturbances such as road banks, road grades, steering misalignment, suspension misalignment, and variation in tire pressure can cause a large lateral controls error bias. Most in-block roads are crowned, causing a bank angle on the right and the left side of the road. Driving mostly on the right side of the road, following the traffic rules, in absence of effective disturbance rejection, increases control error on the right. A disturbance is a single acceleration or specific force experienced by a vehicle in a travel direction. In one example, a transient disturbance can be cross-winds experienced by the vehicle. Sustained periods of high controls error on left side of vehicle may occur when driving on left side of road, for example, on one way roads. Thus, the road bank is one source of controls pose errors.

Steering and suspension misalignment can cause controls reference tracking error and this will lead to a control model deviating from the reference path intended for an autonomous vehicle.

Systems and methods for determining control state estimation for vehicles are described. Additional sensing technologies of an autonomous vehicle are used to generate an improved switch-free control model that handles all vehicle speeds (e.g., zero speed and greater, all speeds in a reverse direction) without divergence. Lateral and longitudinal force disturbance signals are determined for a vehicle with additional sensing technologies (e.g., Light Detection and Ranging (LIDAR) sensor system, camera) and neural networks, deep learning, and three dimensional (3D) mapping. In one example, the LIDAR sensor system determines ranging measurements that are used for localization of a vehicle chassis and other components of a vehicle. The localization information is then used to determine lateral and longitudinal force disturbance signals. The control model can include a 3D vehicle model with roll and pitch. The lateral and longitudinal force disturbance signals are utilized for chassis control-like estimations. The force disturbance signals include lateral disturbance signals for front and rear axles and a total longitudinal disturbance signal. The switch-free control model is able to separate road grade and road bank from other disturbances.

A road grade is an angle of inclination to a horizontal reference. The raising of the outer part of a road above an inner part to take a turn along a track is called the banking of the road. An angle of an inclined track with respect to a horizontal reference is an angle of banking.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

FIG. 1 illustrates an autonomous vehicle and remote computing system architecture in accordance with one embodiment. The autonomous vehicle 102 can navigate about roadways without a human driver based upon sensor signals output by sensor systems 180 of the autonomous vehicle 102. The autonomous vehicle 102 includes a plurality of sensor systems 180 (e.g., a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system to perform ranging measurements for localization.

The camera sensor system aids in classifying objects and tracking the objects over time. The camera sensor system also supports the identification of free space, among other things. The camera sensor system assists in differentiating various types of motor vehicles, pedestrians, bicycles, and free space. The camera sensor system can identify road objects such as construction cones, barriers, and signs and identify objects such as street signs, streetlights, trees and read dynamic speed limit signs. The camera sensor system also identifies attributes of other people and objects on the road, such as brake signals from cars, reverse lamps, turn signals, hazard lights, and emergency vehicles, and detect traffic light states and weather.

The LIDAR sensor system supports localization of the vehicle using ground and height reflections in addition to other reflections. The LIDAR sensor system supports locating and identifying static and dynamic objects in space around the vehicle (e.g., bikes, other vehicles, pedestrians), ground debris and road conditions, and detecting headings of moving objects on the road.

Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of a mechanical system 140, which includes vehicle propulsion system 130, the braking system 208, the steering system 134, the safety system 136, and the cabin system 138. The control service 112 receives sensor signals from the sensor systems 180 and communicates with other services of the internal computing system 110 to effectuate operation of the autonomous vehicle 102. In some embodiments, control service 112 may carry out operations in concert with one or more other systems of autonomous vehicle 102. The control service 112 can control driving operations of the autonomous vehicle 102 based on sensor signals from the sensor systems 180. In one example, the control service receives sensor signals to monitor driving operations and to determine localization of the vehicle. The control service determines lateral force disturbances for front and rear lateral accelerations and a total longitudinal force disturbance along a longitudinal axis for the vehicle based on the localization, sensor signals, road grade, and road bank.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102 such as performing methods disclosed herein. The analysis service 152 can also perform analysis pertaining to data associated with one or more errors or constraints reported by autonomous vehicle 102. In another example, the analysis service 152 is located within the internal computing system 110.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

Figure 2:
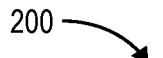
FIG. 2 illustrates an exemplary autonomous vehicle 200 in accordance with one embodiment.

FIG. 2 illustrates an exemplary autonomous vehicle 200 in accordance with one embodiment. The autonomous vehicle 200 can navigate about roadways without a human driver based upon sensor signals output by sensor systems 202-204 of the autonomous vehicle 200. The autonomous vehicle 200 includes a plurality of sensor systems 202-204 (a first sensor system 202 through an Nth sensor system 204). The sensor systems 202-204 are of different types and are arranged about the autonomous vehicle 200. For example, the first sensor system 202 may be a camera sensor system and the Nth sensor system 204 may be a lidar sensor system. Other exemplary sensor systems include, but are not limited to, radar sensor systems, global positioning system (GPS) sensor systems, inertial measurement units (IMU), infrared sensor systems, laser sensor systems, sonar sensor systems, and the like. Furthermore, some or all of the of sensor systems 202-204 may be articulating sensors that can be oriented/rotated such that a field of view of the articulating sensors is directed towards different regions surrounding the autonomous vehicle 200.

The autonomous vehicle 200 further includes several mechanical systems that can be used to effectuate appropriate motion of the autonomous vehicle 200. For instance, the mechanical systems 230 can include but are not limited to, a vehicle propulsion system 206, a braking system 208, and a steering system 210. The vehicle propulsion system 206 may include an electric motor, an internal combustion engine, or both. The braking system 208 can include an engine break, brake pads, actuators, and/or any other suitable componentry that is configured to assist in decelerating the autonomous vehicle 200. The steering system 210 includes suitable componentry that is configured to control the direction of movement of the autonomous vehicle 200 during propulsion.

The autonomous vehicle 200 additionally includes a chassis controller 222 that is activated to manipulate the mechanical systems 206-210 when an activation threshold of the chassis controller 222 is reached.

The autonomous vehicle 200 further comprises a computing system 212 that is in communication with the sensor systems 202-204, the mechanical systems 206-210, and the chassis controller 222. While the chassis controller 222 is activated independently from operations of the computing system 212, the chassis controller 222 may be configured to communicate with the computing system 212, for example, via a controller area network (CAN) bus 224. The computing system 212 includes a processor 214 and memory 216 that stores instructions which are executed by the processor 214 to cause the processor 214 to perform acts in accordance with the instructions.

The memory 216 comprises a path planning system 218 and a control system 220. The path planning system 218 generates a path plan for the autonomous vehicle 200, wherein the path plan can be identified both spatially and temporally according to one or more impending timesteps. The path plan can include one or more maneuvers to be performed by the autonomous vehicle 200.

The control system 220 is configured to control the mechanical systems of the autonomous vehicle 200 (e.g., the vehicle propulsion system 206, the brake system 208, and the steering system 210) based upon an output from the sensor systems 202-204 and/or the path planning system 218. For instance, the mechanical systems can be controlled by the control system 220 to execute the path plan determined by the path planning system 218. Additionally or alternatively, the control system 220 may control the mechanical systems 206-210 to navigate the autonomous vehicle 200 in accordance with outputs received from the sensor systems 202-204.

The control system 220 can control driving operations of the autonomous vehicle 200 based on sensor signals from the sensor systems. In one example, the control system receives sensor signals to monitor driving operations and to determine localization of the vehicle. The control service determines lateral force disturbances for front and rear axle lateral accelerations and a total longitudinal force disturbance for the vehicle based on the localization and the sensor signals. The control system provides a switch-free control model for the vehicle based on the sensor signals, the lateral force disturbances for front and rear lateral accelerations and a total longitudinal force disturbance.

FIG. 3 illustrates a computer-implemented method 300 for utilizing a switch-free control model based on sensor signals from a sensor system in accordance with one embodiment. In one example, sensor signals with sensor data can be obtained from different types of sensors that are coupled to a device, which may be a vehicle, such as vehicle 102, vehicle 200, or vehicle 1200. This computer-implemented method 300 can be performed by processing logic of a computing system that may comprise hardware (circuitry, dedicated logic, a processor, etc.), software (such as is run on a general purpose computer system or a dedicated machine or a device or control service 112), or a combination of both. The method 300 can be performed by an internal computing system 110 or remoting computing system 150 of FIG. 1, the computing system 212 of FIG. 2, or the system 1202.

At operation 301, the computer-implemented method 300 initializes driving operations for a vehicle (e.g., autonomous vehicle with full driving automation (level 5) and no human attention needed, high driving automation (level 4) with no human attention needed in most circumstances, conditional driving automation (level 3) with a human ready to override the AV, partial automation mode (level 2) with the vehicle having automated functions such as acceleration and steering but the driver remains engaged with the driver task and monitors an environment, and driver assistance mode (level 1) with the vehicle controlled by the driver but some driver assist features).

At operation 302, the computer-implemented method 300 obtains sensor signals from a sensor system (e.g., sensor systems 104-106, sensor systems 202, 204, sensor system

1214) of the vehicle. The sensor signals can be obtained from a camera sensor system and a Light Detection and Ranging (LIDAR) sensor system to perform ranging measurements for localization of the vehicle, chassis of the vehicle, and nearby objects within a certain distance of the vehicle and the sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. Localization of the vehicle may include determining location of the tires and chassis. At operation 304, the computer-implemented method 300 determines a set of parameters including vehicle pose estimation, one or more velocities (e.g., velocity in one dimension, velocities in 3D), one or more accelerations (e.g., acceleration in one dimension, accelerations in 3D), roll, pitch, yaw rate, road bank angle, and road grade angle based on the localization and the sensor signals. The control model is able to independently determine pitch, roll, yaw rate, road grade angle, and road bank angle.

At operation 306, the computer-implemented method 300 compares vehicle pose estimation, one or more velocities, and one or more accelerations to expected values from a previous plan of a path planning system to generate comparison signals.

At operation 308, the computer-implemented method 300 determines an expected initial state that includes vehicle pose estimation, one or more velocities, one or more accelerations, commands (e.g., vehicle commands, one or more commands for steering, etc.), and force disturbance signals for the vehicle based on previous output from the control model and the previous plan of the path planning system.

At operation 310, the computer-implemented method 300 uses the comparison signals and the expected initial state to update state including pose estimation, one or more velocities, one or more accelerations, commands, and force disturbance signals for the vehicle. In one example, a filter (e.g., linear quadratic estimator (LQE) which can be a Kalman filter) is used to generate the updated state including pose estimation, one or more velocities, one or more accelerations, commands, and force disturbance signals for the vehicle. The force disturbance signals can include lateral force disturbances (e.g., front and rear axle lateral accelerations ($a_{yf}$, $a_{yr}$)) and a total longitudinal force disturbance. The force disturbance signals are generated based on the localization, the sensor signals, road bank angle, and road grade angle.

Figure 4:
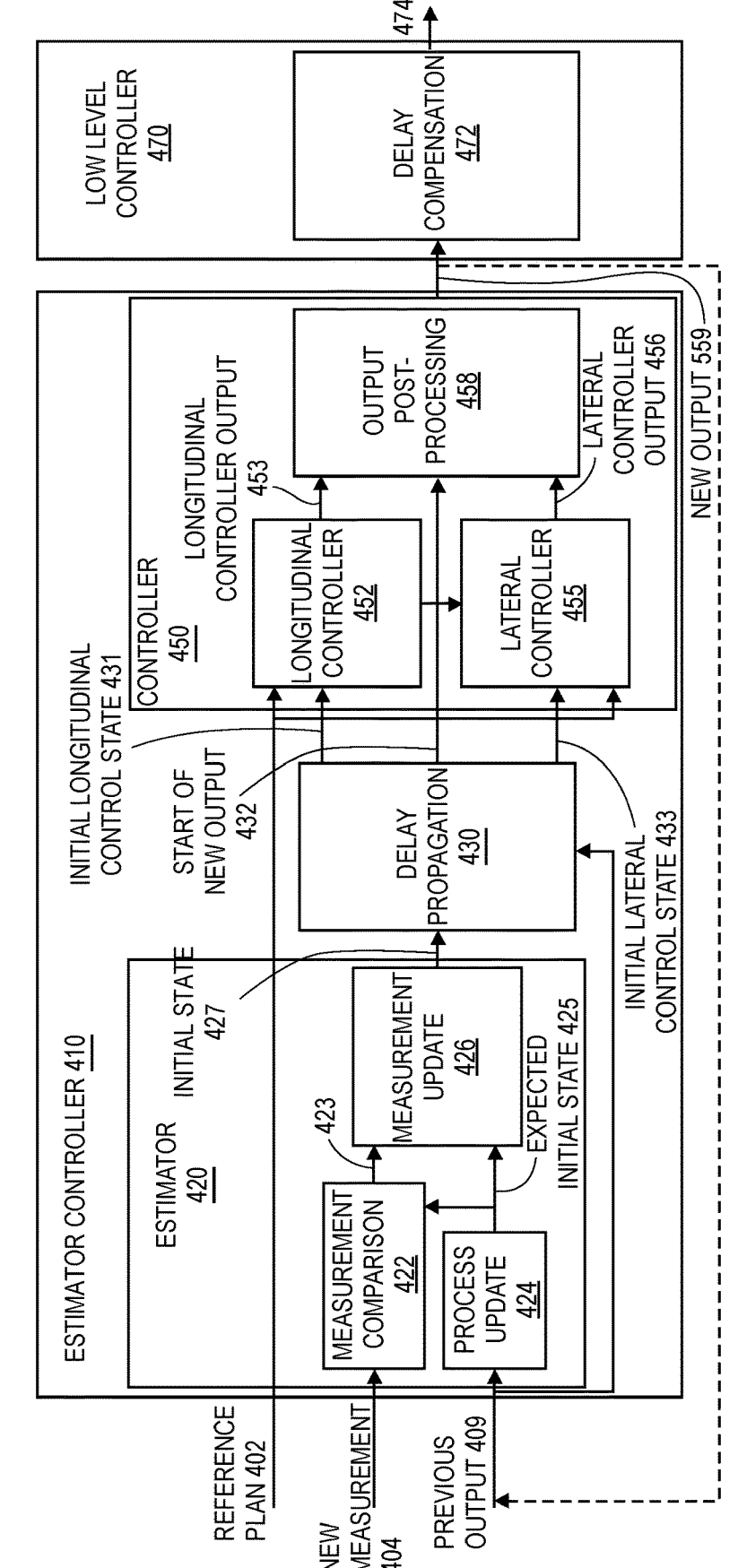
FIG. 4 illustrates a block diagram of a control system for dynamic modeling of a vehicle in accordance with one embodiment.

FIG. 4 illustrates a block diagram of a control system for dynamic modeling of a vehicle in accordance with one embodiment. The control system is configured to control the mechanical systems of an autonomous vehicle (e.g., the vehicle propulsion system 206, the brake system 208, and the steering system 210) based upon an output from sensor systems and/or the path planning system. In one example, sensor signals with sensor data can be obtained from different types of sensors that are coupled to a device, which may be a vehicle, such as vehicle 102, vehicle 200, or vehicle 1200. The operations of components or modules of the control system 400 can be performed by processing logic of a computing system that may comprise hardware (circuitry, dedicated logic, a processor, etc.), software (such as is run on a general purpose computer system or a dedicated machine or a device or control service 112), or a combination of both. The operations can be performed by an internal computing system 110 or remoting computing system 150 of FIG. 1, the computing system 212 of FIG. 2, or the system 1202.

The control system 400 includes an estimator controller 410 and a low level controller 470. The estimator controller 410 includes an estimator 420 and a controller 450.

The estimator 420 includes a measurement comparison module 422 to receive new measurements 404 including pose, one or more velocities, and one or more accelerations for the vehicle. The measurement comparison module 422 compares the new measurements from sensors of the vehicle to expected values from a previous plan of a path planning system to generate updated comparison signals 423 that are provided to a measurement update module 426.

A process update module 424 receives previous output 409 from the controller 450 and interpolates a previous plan of the path planning system to time of measurements. The previous output 409 can include vehicle trajectory, commands (e.g., vehicle commands, one or more commands for steering, etc.), and force disturbance signals over a finite time horizon. The process update module 424 generates an expected initial state 425 that includes pose, one or more velocities, one or more accelerations, commands, and force disturbance signals for the vehicle. The expected initial state 425 is provided to the measurement comparison module 422. The comparison signals 423 and the expected initial state 425 are used by the measurement update module 426 to update state using a filter (e.g., linear quadratic estimator (LQE) which can be a Kalman filter) to generate initial state 427 including pose, velocities, accelerations, commands, and force disturbance signals for the vehicle.

The force disturbance signals can include front and rear axle lateral accelerations ($a_{yf}$, $a_{yr}$) and a total longitudinal force disturbance. Lateral acceleration acts transversely to a direction of heading of a vehicle. Lateral acceleration is a component of vehicle acceleration in direction (e.g., left directionality+/right directionality−) of a lateral Y axis. Lateral acceleration is noticed when driving through a bend in a road as a centrifugal force towards the outside of the bend. Longitudinal acceleration acts along a direction of heading of a vehicle. Longitudinal acceleration is positive in a direction of forward heading of the vehicle. Longitudinal acceleration is a component of vehicle acceleration in direction (e.g., forward directionality+/reverse directionality−) of a longitudinal X axis.

A delay propagation module 430 receives the initial state 427 and propagates state forward using previous commands to account for delay (e.g., delay from actuators of the vehicle). The delay propagation module 430 generates initial longitudinal control state 431 including longitudinal pose, one or more velocities, one or more accelerations, commands, and force disturbance signals for the vehicle. The delay propagation module 430 generates a start of new output 432 including pose, one or more velocities, one or more accelerations, commands, and force disturbance signals for the vehicle over a finite time horizon or planning horizon, which is a fixed point of time in the future at which point certain processes will be evaluated.

The delay propagation module 430 generates initial lateral control state 433 including lateral pose, one or more velocities, one or more accelerations, commands, and force disturbance signals for the vehicle.

The controller 450 includes longitudinal controller 452, lateral controller 455, and output post-processing module 458. The longitudinal controller 452 formulates and solves an optimization to determine longitudinal control commands and trajectory over a finite time horizon (e.g., linear quadratic regulator (LQR), finite horizon model predictive controller (MPC)) based on receiving the reference plan 402 and initial longitudinal control state 431. The longitudinal controller 452 generates output 453 including longitudinal pose, velocities, accelerations, commands, and force disturbance signals for the vehicle over a finite time horizon.

The lateral controller 455 formulates and solves an optimization to determine lateral control commands and trajectory over a finite time horizon (e.g., linear quadratic regulator (LQR), finite horizon model predictive controller (MPC)) based on receiving the reference plan 402 and initial lateral control state 433. In one example, LQR is chosen due to providing a more performant, more robust way to expand horizon and expand the control state compared to MPC. In one example, this method could be temporal and enable turning at zero speed, which can be referred to as static steer. The dynamic control model converges at any vehicle speed including zero speed. The lateral controller 455 generates output 456 including lateral pose, one or more velocities, one or more accelerations, commands, and force disturbance signals for the vehicle over a finite time horizon.

The output post-processing module 458 receives input from the longitudinal controller output 453, output 432, and lateral controller output 456 and generates new output 459 based on the input. The new output 459 includes trajectories, commands, and force disturbance signals for the vehicle over a finite time horizon.

A low level controller 470 includes a delay compensation module 472 that receives the new output 459, determines delay (e.g., from actuators), and compensates for the delay by sending the actuator commands 474 in output ahead of a current time (e.g., same duration as in earlier propagation operation).

Most components or modules of the control system 400 run as single execution, triggered by new measurement input. The delay compensation module 472 can run asynchronously, enabling hard real-time enforcement, higher sampling rates, or other architectures.

In one example, components or modules of the estimator controller 410 can run at a lower update rate or may be subject to timing jitter and/or skipped ticks of a reference clock signal, all found on non-real-time, non-deterministic compute platforms. Not a requirement to be on a compute platform, but control system 400 is compatible with a compute platform. The delay compensation module 472 can run at a higher update rate, and/or have hard real-time guarantees applied to it.

The control system 400 can behave analogous to a proportional integral derivate (PID) controller that continuously calculates an error value (e.g., comparison signals 423) as the difference between a desired setpoint (SP) and a measured process variable (PV) and applies a correction based on proportional, integral, and derivative terms (denoted P, I, and D respectively). The estimated lateral and longitudinal force disturbance signals behave in a similar manner as the I in the PID controller due to these force disturbance signals enabling the controller to attain zero steady-state error and enable the control model to fully represent and compensate for road bank, road grade, steering misalignment, suspension misalignment, cross-winds, variation in tire pressure between different tires, and other disturbances.

The front and rear lateral accelerations used in the control system enable an exact representation of steering misalignment, road bank, and cross-winds.

At a basic level, the dynamic model used in the lateral controller 455 has 2 degrees of freedom (DOF) (e.g., lateral and yaw modes). Correspondingly, two disturbances are needed to fully characterize a wide array of disturbances, only using one disturbance will result in some nonzero errors. For example, if the vehicle is driving straight on a banked road, which is a case frequently found during in-block driving due to road crown, the vehicle will have a nonzero sideslip angle since the rear tire force, to counteract the bank, is not zero. In vehicle dynamics, the sideslip angle is an angle between a direction the vehicle is pointing, also known as heading, and a direction that the vehicle is actually traveling, also known as bearing. These conditions cannot be reproduced by a steer angle error, which would not result in a steady-state straight line with nonzero sideslip.

Use of front and rear lateral accelerations can improve modeling of certain parameters. For steering misalignment, front and rear lateral acceleration disturbances have a persistent offset to one another. This offset should persist for a very long duration of time, and can serve as a diagnostic that the vehicle needs service due to the steering misalignment.

For road bank, front and rear lateral acceleration disturbances move in tandem, with the front slightly leading the rear temporally (i.e., goes into and out of banked conditions one wheelbase sooner). Depending on tuning and noise this leading behavior may be hard to see, but the two moving in tandem should be pronounced when caused by road bank.

For cross-winds, front and rear lateral accelerations may move and not necessarily in tandem. This is because the aerodynamic center may not be at the center of gravity (CG) of the vehicle and depends both on the aerodynamic shape of the vehicle and the yaw angle of the wind.

Once the disturbances are estimated, the control system compensates for the disturbances. In one example, integrated compensation is used with a control state including disturbances and no independent compensator terms are needed.

FIG. 5 illustrates a computer-implemented method 500 for control of lateral acceleration limits when disturbances to a vehicle occur in accordance with one embodiment. Acceleration limits are needed to maintain traction between vehicle tires and road surface while staying within response limits under different driving conditions. In one example, sensor signals with sensor data can be obtained from different types of sensors that are coupled to a device, which may be a vehicle, such as vehicle 102, vehicle 200, or vehicle 1200. This computer-implemented method 500 can be performed by processing logic of a computing system that may comprise hardware (circuitry, dedicated logic, a processor, etc.), software (such as is run on a general purpose computer system or a dedicated machine or a device or control service 112), or a combination of both. The method 500 can be performed by an internal or remoting computing system of FIG. 1, the computing system 212 of FIG. 2, or the system 1202.

At operation 501, the computer-implemented method 500 initializes driving operations for a vehicle (e.g., autonomous vehicle with full driving automation (level 5) and no human attention needed, high driving automation (level 4) with no human attention needed in most circumstances, conditional driving automation (level 3) with a human ready to override the AV, partial automation mode (level 2) with the vehicle having automated functions such as acceleration and steering but the driver remains engaged with the driver task and monitors an environment, and driver assistance mode (level 1) with the vehicle controlled by the driver but some driver assist features).

At operation 502, the computer-implemented method 500 obtains sensor signals from a sensor system (e.g., sensor systems 104-106, sensor systems 202, 204, sensor system 1214). The sensor signals can be obtained from a camera sensor system and a Light Detection and Ranging (LIDAR) sensor system to perform ranging measurements for localization of the vehicle, chassis of the vehicle, and nearby objects within a certain distance of the vehicle and the sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. Localization of the vehicle based on the sensor signals may include determining location of the tires and chassis.

At operation 504, the computer-implemented method 500 determines different parameters including vehicle pose estimation, velocities, accelerations, roll, pitch, yaw rate, road bank angle, and road grade angle based on the localization and the sensor signals. The control model is able to independently determine pitch, roll, yaw rate, road grade angle, and road bank angle.

At operation 506, the computer-implemented method 500 determines steer angle limits from lateral acceleration limits and force disturbance signals. Lateral acceleration limits can be set a priori or adjusted in real-time due to measurements. In one embodiment, these limits can also be adjusted for environmental conditions such as weather, road condition, and temperature. In one example, steer angle can be scaled to represent a commanded curvature, equivalent to the curvature of a steady-state turn on a flat, disturbance-less plane with the given steer angle. Force disturbance signals can include lateral force disturbances (e.g., front and rear axle lateral accelerations ($a_{yf}$, $a_{yr}$)) and a total longitudinal force disturbance. The lateral acceleration limits and force disturbance signals are based on the localization, the sensor signals, road bank angle, and road grade angle. The separation of the road bank angle and the road grade angle improves an estimation of the force disturbance signals and influences the lateral acceleration limits.

At operation 508, the computer-implemented method 500, in one example, maintains a control model that causes no shift in steer angle limits that correspond to lateral acceleration limits based on detection of a disturbance.

In another embodiment, when subject to a disturbance, the steering angle limits that correspond to lateral acceleration limits are shifted. This would reflect a design that intends to limit lateral tire forces, expressed as nominal lateral acceleration limits. A change in steering angle limits can be determined using the same underlying vehicle model as the controller.

Figure 6:
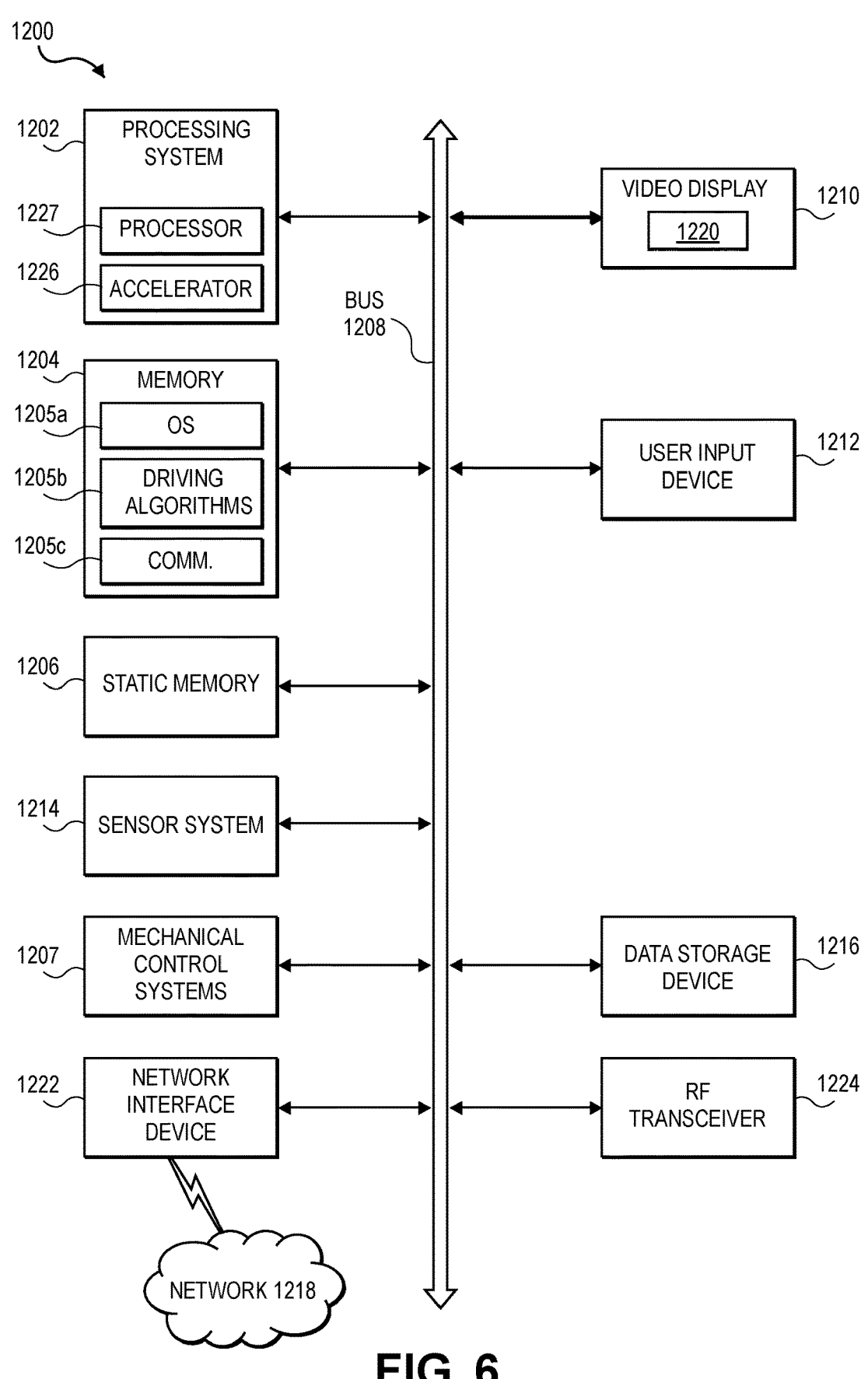
FIG. 6 is a block diagram of a vehicle 1200 having driver assistance according to an embodiment of the invention.

FIG. 6 is a block diagram of a vehicle 1200 having driver assistance according to an embodiment of the invention. Within the processing system 1202 (or computer system 1202) is a set of instructions (one or more software programs) for causing the machine to perform any one or more of the methodologies discussed herein including methods 300 and 500. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The processing system 1202, as disclosed above, includes processing logic in the form of a general purpose instruction-based processor 1227 or an accelerator 1226 (e.g., graphics processing units (GPUs), FPGA, ASIC, etc.)). The general purpose instruction-based processor may be one or more general purpose instruction-based processors or processing devices (e.g., microprocessor, central processing unit, or the like). More particularly, processing system 1202 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like. Processing system 1202 is configured to perform the operations and methods discussed herein. The exemplary vehicle 1200 includes a processing system 1202, main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable non-transitory computer-readable storage medium), which communicate with each other via a bus 1208. The storage units disclosed herein may be configured to implement the data storing mechanisms for performing the operations and methods discussed herein. Memory 1206 can store code and/or data for use by processor 1227 or accelerator 1226. Memory 1206 include a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 1227 and accelerator 1226 execute various software components stored in memory 1204 to perform various functions for system 1202. Furthermore, memory 1206 may store additional modules and data structures not described above.

Operating system 1205a includes various procedures, sets of instructions, software components and/or drivers for controlling and managing general system tasks and facilitates communication between various hardware and software components. Driving algorithms 1205b (e.g., object detection, segmentation, path planning, method 300, method 500, etc.) utilize sensor data from the sensor system 1214 to provide object detection, segmentation, driver assistance features, and switch-free control models for different applications such as driving operations of vehicles. A communication module 1205c provides communication with other devices utilizing the network interface device 1222 or RF transceiver 1224.

The vehicle 1200 may further include a network interface device 1222. In an alternative embodiment, the data processing system disclosed is integrated into the network interface device 1222 as disclosed herein. The vehicle 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), and a Graphic User Interface (GUI) 1220 (e.g., a touch-screen with input & output functionality) that is provided by the video display unit 1210.

The vehicle 1200 may further include a RF transceiver 1224 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The data storage device 1216 may include a machine-readable storage medium (or more specifically a non-transitory computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202, the main memory 1204 and the data processing system 1202 also constituting machine-readable storage media.

In one example, the vehicle 1200 with driver assistance is an autonomous vehicle that may be connected (e.g., networked) to other machines or other autonomous vehicles using a network 1218 (e.g., LAN, WAN, cellular network, or any network). The vehicle can be a distributed system that includes many computers networked within the vehicle. The vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The vehicle can operate in the capacity of a server or a client in a client-server network environment, or as a peer machine in a peer-to-peer (or distributed) network environment. The storage units disclosed in vehicle 1200 may be configured to implement data storing mechanisms for performing the operations of autonomous vehicles.

The vehicle 1200 also includes sensor system 1214 and mechanical control systems 1207 (e.g., chassis control, vehicle propulsion system, driving wheel control, brake control, etc.). The system 1202 executes software instructions to perform different features and functionality (e.g., driving decisions) and provide a graphical user interface 1220 for an occupant of the vehicle. The system 1202 performs the different features and functionality for autonomous operation of the vehicle based at least partially on receiving input from the sensor system 1214 that includes lidar sensors, cameras, radar, GPS, and additional sensors. The system 1202 may be an electronic control unit for the vehicle.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. A computer implemented method for a control model of a vehicle comprising:

obtaining sensor signals from a sensor system of the vehicle to monitor driving operations and to determine localization of the vehicle, including location of tires of the vehicle;

determining a set of parameters, including vehicle pose estimation, velocity, acceleration, roll, pitch, and yaw rate based on the localization and the sensor signals;

interpolating a previous plan of a path planning system to a current time and identifying a set of expected values, including vehicle pose estimation, velocity, acceleration, roll, pitch, and yaw rate, based on the interpolated previous plan and determining an expected initial state that includes vehicle pose estimation, velocity, acceleration, vehicle commands, and force disturbance signals for the vehicle, wherein the measurement update module generates an initial state by applying a filter to the comparison signals and the expected initial state;

comparing the vehicle pose estimation, the velocity, and the acceleration to the expected values from the previous plan of the path planning system to generate comparison signals;

determining force disturbance signals, including lateral force disturbances for front and rear axle lateral accelerations and a total longitudinal force disturbance based on the localization and the sensor signals;

adjusting the control model of the vehicle based on the determined force disturbance signals based on the localization and the sensors signals; and controlling the vehicle using the control model.

2. The computer implemented method of claim 1, further comprising:

using the comparison signals and the expected initial state to generate an initial state of the vehicle, including pose estimation, velocity, acceleration, vehicle command, and force disturbance signals for the vehicle.

3. The computer implemented method of claim 1, wherein the control model comprises a switch-free control model to handle all speeds of the vehicle including zero speed with no divergence.

4. The computer implemented method of claim 1, wherein the control model is able to independently determine pitch, roll, yaw rate, road grade angle, and road bank angle.

5. The computer implemented method of claim 1, wherein the sensor system comprises a camera sensor system and a Light Detection and Ranging (LIDAR) sensor system to perform ranging measurements for localization of the vehicle, chassis of the vehicle, and nearby objects within a certain distance of the vehicle and the sensor system.

6. The computer-implemented method of claim 1, wherein the filter is one of a linear quadratic estimator and a Kalman filter.

7. A computing system, comprising:

a memory storing instructions; and a processor coupled to the memory, the processor is configured to execute instructions of a software program to:

initialize driving operations of an autonomous vehicle;

receive sensor signals from a sensor system of the autonomous vehicle;

determine localization of the autonomous vehicle based on the sensor signals, including location of tires of the vehicle;

determine a set of parameters including vehicle pose estimation, velocity, and acceleration based on the localization and the sensor signals;

interpolating a previous plan of a path planning system to a current time and identifying a set of expected values, including vehicle pose estimation, velocity, acceleration, roll, pitch, and yaw rate, based on the interpolated previous plan, wherein the measurement update module generates an initial state by applying a filter to the comparison signals and the expected initial state;

comparing the vehicle pose estimation, the velocity, and the acceleration to the expected values from the previous plan of the path planning system to generate comparison signals; and determine force disturbance signals including lateral force disturbances for front and rear axle lateral accelerations and a total longitudinal force disturbance based on the localization of the autonomous vehicle and the sensor signals, and adjusting a control model of the vehicle based on the determined force disturbance signals; and controlling the vehicle using the control model.

8. The computing system of claim 7, wherein the processor is configured to execute instructions to:

determine an expected initial state that includes vehicle pose estimation, velocity, acceleration, commands, and force disturbance signals for the vehicle.

9. The computing system of claim 8, wherein the processor is configured to execute instructions to:

utilize the comparison signals and the expected initial state to generate an initial state including pose estimation, velocity, acceleration, commands, and force disturbance signals for the vehicle.

10. The computing system of claim 7, wherein the processor is configured to execute instructions to:

provide a switch-free control model to handle all speeds of the autonomous vehicle including zero speed with no divergence.

11. The computing system of claim 7, wherein the processor is configured to execute instructions to:

determine the set of parameters including roll, pitch, and yaw rate based on the localization and the sensor signals.

12. The computing system of claim 11, wherein the processor is configured to execute instructions to:

independently determine pitch, roll, yaw rate, road grade angle, and road bank angle.

13. The computing system of claim 7, wherein the processor is configured to execute instructions to:

provide a three dimensional (3D) vehicle model with roll and pitch.

14. A non-transitory computer readable storage medium having embodied thereon a program, wherein the program is executable by a processor to perform a method comprising:

initializing driving operations for a vehicle;

obtaining sensor signals from a sensor system of the vehicle and determining localization of the vehicle based on the sensor signals, including location of tires of the vehicle;

determining vehicle pose estimation, velocity, acceleration, road bank angle, and road grade angle based on the localization of the vehicle and the sensor signals, including location of tires of the vehicle interpolating a previous plan of a path planning system to a current time and identifying a set of expected values, including vehicle pose estimation, velocity, acceleration, roll, pitch, and yaw rate, based on the interpolated previous plan, wherein the measurement update module generates an initial state by applying a filter to the comparison signals and the expected initial state;

comparing the vehicle pose estimation, the velocity, and the acceleration to the expected values from the previous plan of the path planning system to generate comparison signals;

determining lateral acceleration limits and force disturbance signals including front and rear axle lateral accelerations (ayf, ayr)) and a total longitudinal force disturbance based on the localization, road bank angle, and road grade angle;

adjusting a control model of the vehicle based on the determined force disturbance signals; and controlling the vehicle using the control model.

15. The non-transitory computer readable storage medium of claim 14, wherein the force disturbance signals comprise front and rear axle lateral accelerations (ayf, ayr)) and a total longitudinal force disturbance.

16. The non-transitory computer readable storage medium of claim 15, wherein the method further comprises:

maintaining a control model that causes no shift in steering angle limits that correspond to lateral acceleration limits in presence of one or more disturbances.

17. The non-transitory computer readable storage medium of claim 16, wherein the control model is able to independently determine pitch, roll, yaw rate, road grade angle, and road bank angle.

18. The non-transitory computer readable storage medium of claim 15, wherein the lateral acceleration limits can be set a priori or adjusted in real-time due to measurements of the sensor signals.

* * * * *